United States Patent
Clark et al.

(10) Patent No.: US 6,994,575 B1
(45) Date of Patent: Feb. 7, 2006

(54) DESKTOP CHARGER WITH ADJUSTABLE CONNECTOR MODULE

(75) Inventors: Aaron P. Clark, Buford, GA (US); Venkateshwaran V. Sampath, Grayslake, IL (US); Xu-Gang "Joly" Wu, ShangHai (CN)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/020,401

(22) Filed: Dec. 22, 2004

(51) Int. Cl.
*H01R 29/00* (2006.01)
(52) U.S. Cl. .................. 439/173; 439/529; 439/929; 439/246
(58) Field of Classification Search .......... 439/529, 439/929, 246, 171, 173–174
See application file for complete search history.

(56) References Cited

U.S. PATENT DOCUMENTS

| | | | |
|---|---|---|---|
| D394,423 S | 5/1998 | Nagele et al. | |
| 6,193,546 B1 * | 2/2001 | Sadler | 439/534 |
| 6,326,097 B1 * | 12/2001 | Hockaday | 429/34 |
| 6,392,382 B1 | 5/2002 | Faerber et al. | |
| 6,483,698 B1 * | 11/2002 | Loh | 361/686 |
| 6,716,058 B2 * | 4/2004 | Youn | 439/535 |

\* cited by examiner

*Primary Examiner*—Truc Nguyen
(74) *Attorney, Agent, or Firm*—Hisashi D. Watanabe

(57) ABSTRACT

A charger having an adjustable connector accommodates a plurality of electronic devices having different form factors. In one embodiment, the charger includes at least one pocket for receiving an electronic device, like a cellular telephone. Within the pocket, an electronic connector capable of supplying power to the electronic device is mounted atop an optionally detachable adjustable connector support member. The adjustable connector support module has cantilever arms that have protrusions disposed thereon. The cantilever arms are preloaded against adjustment tracks that include a series of ratchet grooves. By applying a lateral force against the adjustable connector support module, the connector may be moved laterally from a first position to a second position. Where the adjustable connector support module is detachable from the charger, the adjustable connector support module may be coupled to a connector base member by way of snap features that engage travel rails on the connector support member. A pivoting support lid provides a mechanical support for the electronic device when inserted into the pocket.

20 Claims, 4 Drawing Sheets

US 6,994,575 B1

DESKTOP CHARGER WITH ADJUSTABLE CONNECTOR MODULE

BACKGROUND

1. Technical Field

This invention relates generally to desktop chargers, and more particularly to a desktop charger having a moveable connector module so as to accommodate different electronic devices with different form factors.

2. Background Art

Cellular phones are becoming more and more popular. Advances in technology have made phones smaller and more affordable. Often, to sign customers to annual contracts, cellular service providers will actually give away cellular phones. As a result, while cellular telephones were once only used by the wealthy, they are becoming commonplace across all sectors of society.

Cellular phones come in all shapes and sizes. Even within one manufacturer's product line, each cellular phone may have its own unique size and shape. For example, the Razr V3, V600, V220, V180 and MPx220 phones manufactured by Motorola each have unique shapes and sizes. The Razr V3 is only 0.54 inches thick, while the V600, V220, V180 and MPx220 are 0.9, 0.95, 1, and 0.96 inches thick, respectively.

To further complicate matters, the batteries that these phones use can come in a variety of shapes and sizes. One particular phone may be capable of using both a small battery with limited energy storage capacity and a bigger, more bulky battery that has a higher energy storage capacity.

All of these devices, however, rely on batteries for their portability. These batteries, regardless of type, must eventually be recharged. They can be charged in a number of ways. Some phone manufacturers sell power supplies that can be connected by a wire to the phone. People often prefer, however, to have a charger that can be placed on a table or desk. Companies therefore sell chargers that are designed to sit atop a desk and hold a phone while charging. The charger generally has a pocket into which the phone is inserted. Sometimes, the charger will have a second pocked for charging a spare battery.

The pockets must be capable of providing mechanical support for the phone and/or battery. In the case of a phone, the phone typically sits in an easily viewable, upright position that allows it to receive incoming calls. A problem arises in that manufacturers prefer to have a single charger that can accommodate an entire product line over designing and manufacturing custom chargers for each phone.

As such, chargers, in order to be versatile, must accommodate different phones with different shapes and sizes. One way to accommodate different phones is to provide a charger with a pocket large enough to receive the largest phone. Using this scheme, when a smaller phone is placed in the pocket, neither the phone nor the battery is supported by the plastic of the charger. Instead, the phone uses the charger's interlocking connector as a support mechanism. When the phone connector mates with the charger connector, the charger connector itself is responsible for providing the mechanical support. This scheme is illustrated in U.S. design Pat. No. D394,423. The problem with this scheme is that the connectors are generally not robust mechanical supports. They sometimes break, rendering the charger useless.

There is therefore a need for a charger with means for supporting a phone that accommodates a variety of phone form factors.

DETAILED DESCRIPTION OF THE INVENTION

Figure 1:
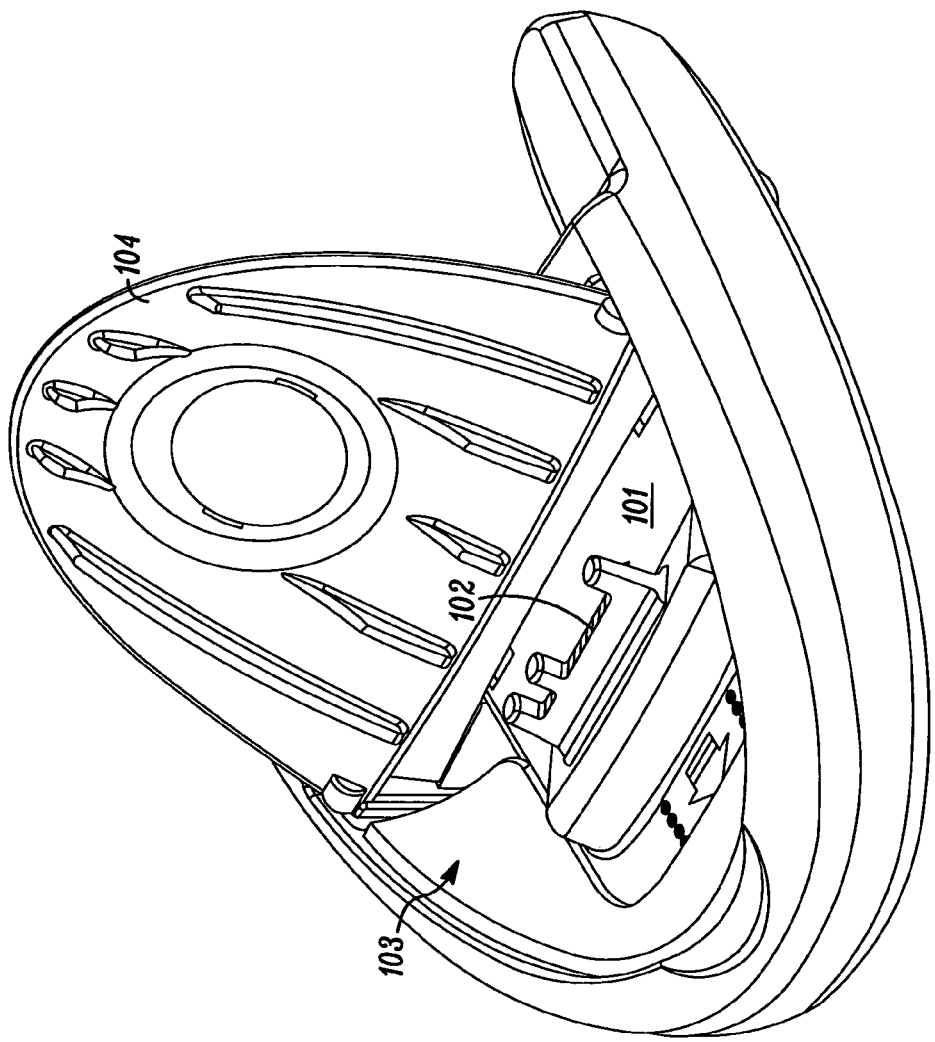
FIG. 1 illustrates a charger in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention accommodates various phone sizes in a single charger design. The charger includes a pocket having an adjustable connector module that is used in conjunction with a permanently located backing support feature. The adjustable connector module is laterally moveable between several positions so as to accommodate various phone sizes. The invention easily allows a user to adjust the phone fit with one hand without screws or other mechanical parts.

Turning now to FIG. 1, illustrated therein is a desktop charger 100 capable of accommodating a variety of portable electronic devices having a variety of form factors in accordance with the invention. The charger 100 has a pocket 103 into which a portable electronic device, like a cellular phone for example, may be inserted. The pocket includes a connector 102 that is disposed upon an adjustable connector support module 101. In this exemplary embodiment, the connector 102 is a 17-pin male connector, although it will be clear to those of ordinary skill in the art having the benefit of this disclosure that any of a variety of connectors may be used. The adjustable connector support module 101 is capable of laterally moving back and forth within the charger 100 between at least a first position and a second position.

A pivoting support lid 104 is capable of rotating between a first, open position and a second, closed position. When the pivoting support lid 104 is in the first, open position, it serves as a planar, mechanical support against which a portable electronic device may rest. When the pivoting support lid 104 is in the second, closed position, it serves as both a dust cover for the pocket 103 and as an aesthetically pleasing design feature.

The adjustable connector support module 101, as noted above, is capable of moving laterally within the pocket 103. In so doing, the connector 102, which is disposed atop the adjustable connector support module 101, also moves laterally to and from the rear of the pocket 103 where the pivoting support lid 104 is located. By moving the connector 102 away from the pivoting support lid 104, phones with thicker form factors may be accommodated. By moving the connector 102 towards the pivoting support lid, phones with thinner form factors may be accommodated.

Figure 2:
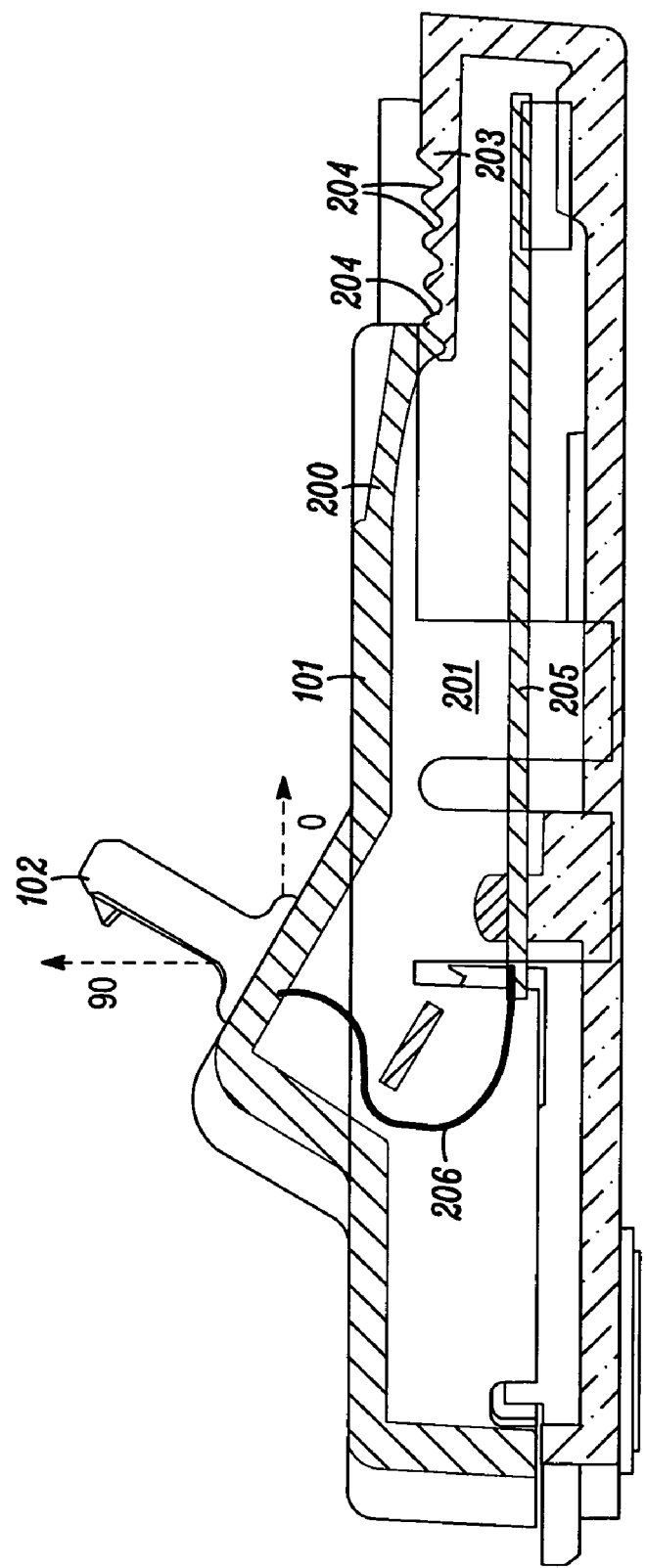
FIG. 2 illustrates a sectional view of a charger in accordance with the invention.

Turning now to FIG. 2, illustrated therein is a sectional view of a charger in accordance with the invention. From this sectional view, one preferred embodiment of the adjustment mechanism may be seen. As in FIG. 1, the adjustable connector module 101 and connector 102 are illustrated. In this embodiment, the adjustable connector module 101 has at least one cantilever arm 200 having a protrusion 201 disposed thereon extending outward from the adjustable connector module 101. The protrusion 201 of the cantilever arm 200 engages with a plurality of ratchet grooves 204 disposed within an adjustment track 203 in the charger.

When a user exerts a lateral force upon the adjustable connector support member 101 with a finger or other object, the cantilever arm 200 deflects slightly, causing the protrusion 201 to pass over a ratchet wall into an adjacent groove. As the cantilever arm 200 is preloaded against the adjustment track, the protrusion 201 will come to rest in a neighboring ratchet groove when the lateral force is removed. As such, the adjustable connector support member 101 will thus be held in its new position.

The connector 102 extends distally from the adjustable connector support module 101 at an angle of between 0 and 90 degrees. The angle is preferably one that will make an external display on a cellular phone easily readable by a user when the charger is mounted on a desk or other flat surface. Such an angle is preferably between 45 and 60 degrees.

An optional printed circuit board 205 may be included within the charger. This printed circuit board 205 may include charging circuitry, fuel gauging circuitry, safety circuitry and the like. As the charger is primarily designed to supply power to the rechargeable battery coupled to the cellular phone, a coupling mechanism, like a flexible circuit substrate 206 for example, may couple the printed circuit board 205 to the connector 102. This flexible circuit substrate 206 couples power to the connector for recharging the cellular phone.

Figure 3:
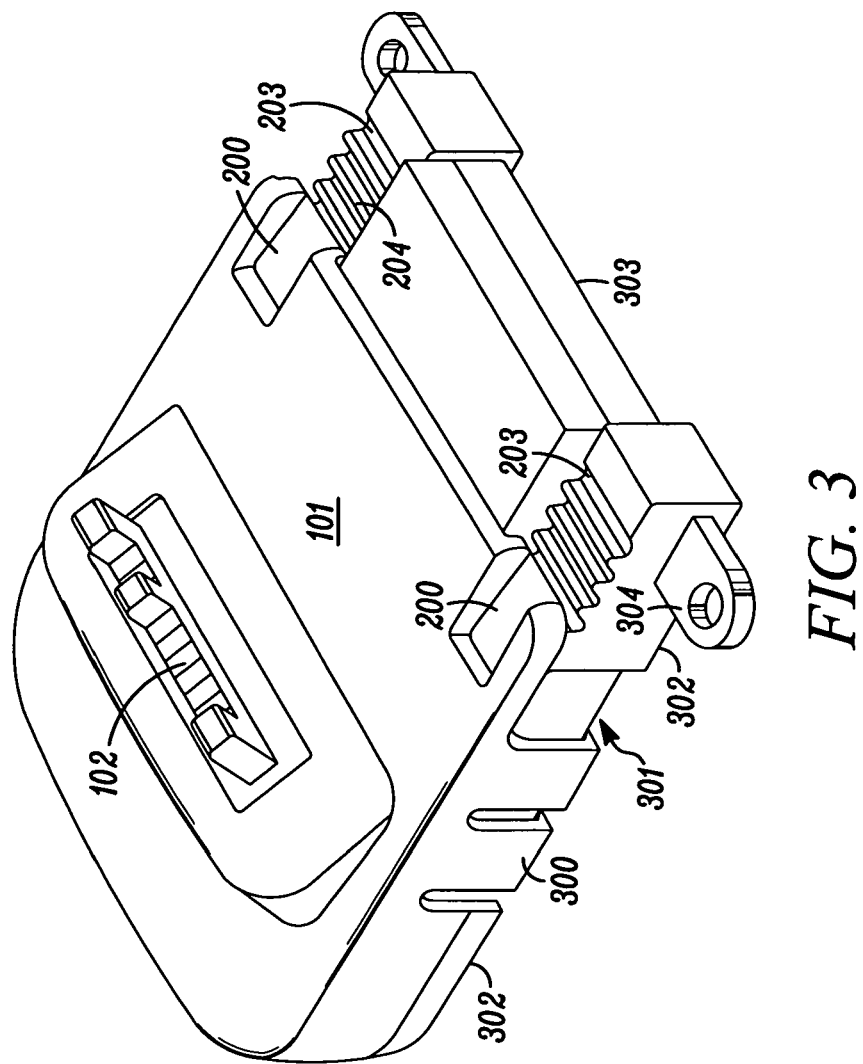
FIG. 3 illustrates a perspective view of an adjustable connector support module coupled to a connector base member in accordance with the invention.

Turning now to FIG. 3, illustrated therein is a perspective view of a connector assembly in accordance with the invention. In one preferred embodiment, the adjustable connector support module 101 is selectively detachable from the charger. In this particular embodiment, the adjustable connector support module 101 is coupled to a connector base member 303. The connector base member 303 couples to the charger by way of screw bosses 304.

The connector base member 303 has a pair of adjustment tracks 203, each having ratchet grooves 204 disposed therein. A pair of cantilever arms 200 extends from the adjustable connector support module 101. Each cantilever arm 200 includes a protrusion that couples to the ratchet grooves 204 in the adjustment tracks 203. The adjustable connector support module 101 is thus laterally moveable between at least a first position and a second position relative to the connector base member 303.

In this particular embodiment, the adjustable connector support module 101 is selectively detachable from the connector base member 303. The adjustable connector support module 101 couples to the connector base member 303 by way of snap arms 300. This embodiment includes at least two snap arms 300 (one snap arm is on the other side and therefore not visible in this view) that engage a pair of travel rails, e.g. 301, on the connector base member 303. Mechanical stops 302 are disposed about the travel rails 301 to prevent the adjustable connector support module 101 from hyper extending beyond the length of the travel rails 301.

Figure 4:
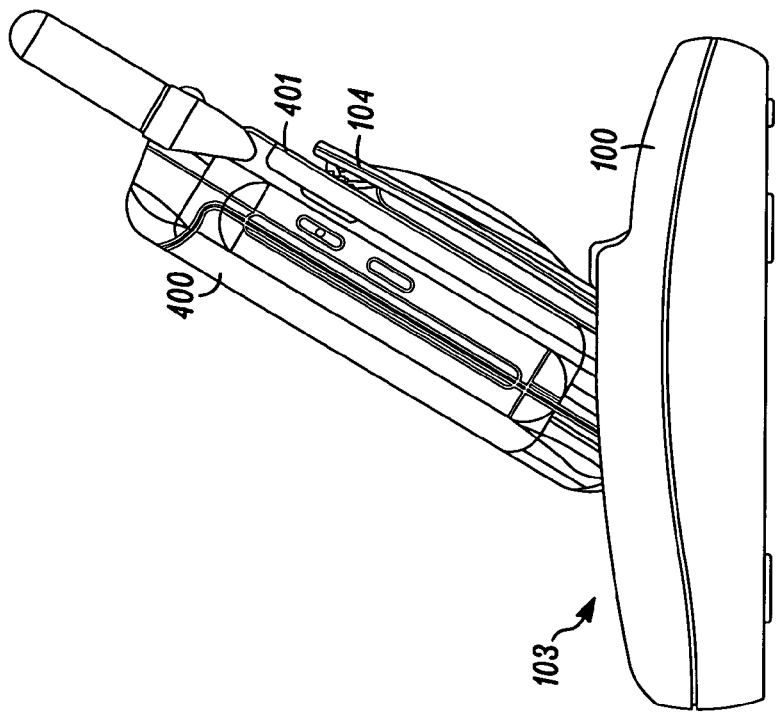
FIG. 4 illustrates an electronic device inserted into a charger in accordance with the invention where the connector is in a first position.

Turning now to FIG. 4, illustrated therein is a charger 100 with an adjustable connector in accordance with the invention, wherein the connector is moved to a first position. An electronic device 400 has been inserted into the pocket 103 of the charger 100 such that the electronic device 400 couples with the connector. As the connector is capable of supplying power to the electronic device 400, the device 400 is now ready to be charged.

As can be seen in FIG. 4, the connector has been positioned away from the pivoting support lid 104. Such a position is suitable for accommodating an electronic device that is larger than device 400. Such a position is unsuitable for device 400, in that the back 401 of the device 400 is not resting against the pivoting support lid. To adjust the charger 100 so as to properly accommodate device 400, one simply exerts a light, lateral force against the adjustable connector support module disposed within the pocket 103 as noted above.

Figure 5:
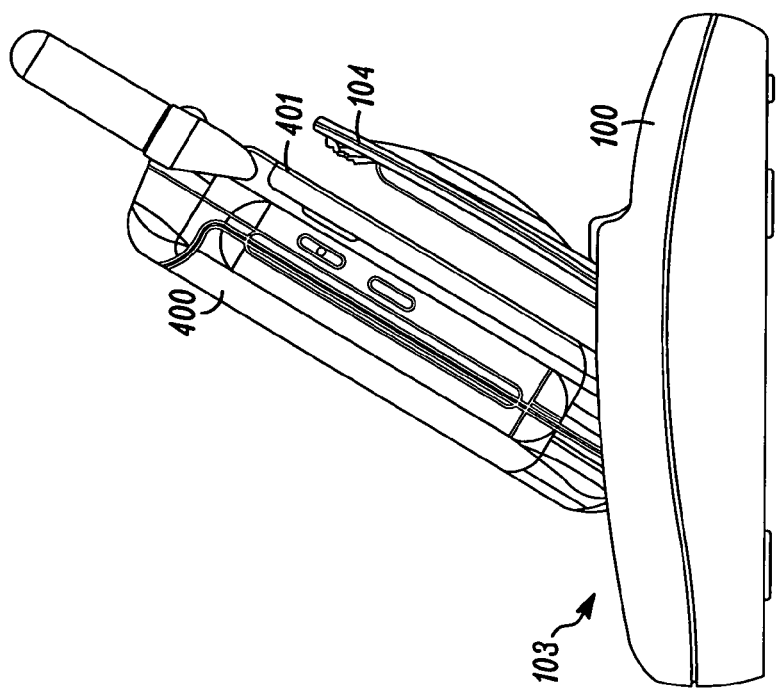
FIG. 5 illustrates an electronic device inserted into a charger in accordance with the invention where the connector is in a second position.

Turning now to FIG. 5, illustrated therein is the same charger 100 with the connector positioned in a second position that is closer to the pivoting support lid 104. As can be seen in this view, the position of the connector is such that the back 401 of the device 400 is resting against the pivoting support lid 104. In this position, the pivoting support lid 104 provides a stabilizing mechanical support for the device 400.

To recap, this invention provides a charger having an adjustable connector that moves relative to a fixed support member. One of any of a variety of phone connectors is mounted to an adjustable connector support member. The adjustable connector support member is capable of laterally sliding back and forth relative to either the charger or a connector base member disposed within the charger. The adjustable connector support member includes preloaded cantilever arms having protrusions disposed thereon. The protrusions fit into a plurality of ratchet grooves, each protrusion-ratchet groove engagement providing a unique connector position.

A pivoting phone support lid provides a permanent backing support for the devices in the charger assembly when in an open position. In its closed position, the lid also serves as a dust protector for the pocket and phone connector.

The adjustable connector provides the end user with an easier method of accommodating alternate phones in a desktop charger. The connector position is changed by simply pushing the connector to an alternate location without removing parts.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a cellular phone is used herein as an exemplary electronic device, it will be clear to those of ordinary skill in the art having the benefit of this disclosure that the charger of this invention could equally be used for radios, personal data assistants, MP3 players, portable computers, pagers and the like.

What is claimed is:

1. A desktop charger, comprising:
   a. at least one pocket for receiving an electronic device;
   b. an adjustable connector support member having a connector disposed thereon, the adjustable connector support member comprising at least one cantilever arm having a protrusion disposed thereon; and
   c. a plurality of ratchet grooves disposed within the charger for engaging the protrusion;

wherein the adjustable connector support member is moveable from at least a first position to a second position.

2. The charger of claim 1, wherein the electronic device is selected from the group consisting of cellular phones, radios, personal data assistants, MP3 players, portable computers and pagers.

3. The charger of claim 1, wherein the adjustable connector support member comprises at least two cantilever arms having protrusions disposed thereon.

4. The charger of claim 1, further comprising a pivoting support lid.

5. The charger of claim 1, wherein the plurality of ratchet grooves is disposed upon a connector module base member that is detachable from the charger.

6. The charger of claim 5, wherein the adjustable connector support member is detachable from the connector module base member.

7. The charger of claim 6, wherein the adjustable connector support member comprises at least two snap arms for coupling the adjustable connector support member to the connector module base member.

8. The charger of claim 7, wherein the connector module base member comprises at least two travel rails for coupling to the at least two snap arms.

9. The charger of claim 8, wherein the connector module base member comprises mechanical stops about the at least two travel rails.

10. The charger of claim 9, further comprising a flexible circuit substrate that couples the connector with the connector module base member.

11. The charger of claim 3, wherein the connector extends from the adjustable connector support at an angle of between 0 and 90 degrees.

12. The charger of claim 11, further comprising a planar support extending from the pocket for supporting the electronic device.

13. A desktop charger, comprising:
  a. at least one pocket for receiving an electronic device;
  b. an adjustable connector support member having a connector disposed thereon, the adjustable connector support member comprising at least one cantilever arm having a protrusion disposed thereon; and
  c. an adjustment track comprising a plurality of ratchet grooves for engaging the protrusion;

wherein the adjustable connector support member is laterally moveable from at least a first position to a second position.

14. The charger of claim 13, wherein the adjustable connector support member is detachable from the charger.

15. The charger of claim 13, wherein the adjustable connector support member comprises at least one snap feature for coupling the adjustable connector support member to the charger.

16. The charger of claim 15, wherein the connector is electrically coupled to the charger by a flexible circuit substrate.

17. The charger of claim 13, wherein the connector extends distally from the adjustable connector support member at an angle of between 0 and 90 degrees.

18. The charger of claim 17, wherein the connector comprises a 17-pin, male connector.

19. The charger of claim 17, wherein the connector is capable of supplying power to an electronic device.

20. The charger of claim 13, further comprising a pivoting support lid.

* * * * *